(12) United States Patent
Viti

(10) Patent No.: US 7,554,280 B2
(45) Date of Patent: Jun. 30, 2009

(54) MONITORING DEVICE OF ROTOR POSITION OF AN ELECTRIC MOTOR AND CORRESPONDING METHOD

(75) Inventor: Marco Viti, Cornaredo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 125 days.

(21) Appl. No.: 11/735,199

(22) Filed: Apr. 13, 2007

(65) Prior Publication Data
US 2007/0296360 A1    Dec. 27, 2007

(30) Foreign Application Priority Data
Apr. 14, 2006    (EP) .................................. 06425267

(51) Int. Cl.
*H02P 6/00*    (2006.01)
(52) U.S. Cl. ........................... 318/400.35; 318/400.11; 318/400.21
(58) Field of Classification Search ............ 318/400.35, 318/400.11, 400.21, 400.12, 271, 276, 278, 318/430, 431, 277; 388/842, 904
See application file for complete search history.

(56) References Cited

U.S. PATENT DOCUMENTS

| | | | |
|---|---|---|---|
| 5,969,491 A | | 10/1999 | Viti et al. |
| 6,023,141 A | * | 2/2000 | Chalupa ................ 318/400.35 |
| 2004/0154411 A1 | | 8/2004 | Viti |

* cited by examiner

*Primary Examiner*—Karen Masih
(74) *Attorney, Agent, or Firm*—Lisa K. Jorgenson; Robert Iannucci; Seed IP Law Group PLLC

(57) ABSTRACT

A monitoring device for an electric motor has in input a signal representing zero crossings of the back-electromotive force of the motor and comprises a monitor that detects the signal in first periods of time arranged around instants of time in which the zero crossings are expected. The device comprises a setting circuit that sets second periods of time that are less than the first periods of time and each second period of time is centered on the instant of time in which the zero crossing is expected. The monitor comprises a detector that tests whether each actual zero crossing occurs inside the second period of time and a controller that modifies by a quantity the subsequent period of electric revolution time between two consecutive expected instants of zero crossing if said actual zero crossing occurs outside the second period of time.

21 Claims, 4 Drawing Sheets

MONITORING DEVICE OF ROTOR POSITION OF AN ELECTRIC MOTOR AND CORRESPONDING METHOD

BACKGROUND OF THE INVENTION

1. Field of the Invention

The present invention refers to a device for monitoring the position of the rotor of an electric motor, in particular of a brushless motor, and the corresponding method.

2. Description of the Related Art

A DC brushless motor consists of a permanent magnet and of a stator consisting of a certain number of windings (generally three) normally star or polygon connected (for example triangle or delta). The windings are driven by means of a driving circuit the output stage of which generally comprises a half bridge (two bipolar or MOS transistors) for each winding.

FIG. 1 shows a typical circuit diagram of an output stage 1 and a motor 2 connected to it with three star-configured phases; the motor is indicated by means of three star-connected windings La, Lb and Lc. Detection of the position of the rotor during rotation generally involves the output stage of a winding of the motor, for example the output stage of winding La, being put into high impedance status, and the use of a circuit 3 suitable for detecting a Pbemf signal showing the polarity of the induced back-electromotive force (BEMF) of said winding in order to be able to detect zero crossing or ZC of the BEMF. This indicates the instantaneous position of the rotor whereas speed is calculated simply as the time distance of the last two ZC measurements. These data are thus used for driving the motor in a synchronous manner. The type of detection of position and speed is very applicable to motors the mechanical construction of which is near the ideal, i.e., motors whose poles are as equal as possible throughout the entire mechanical turn.

A first solution to the problem of optimizing driving also in the case of pairs of dissimilar polar couples is known from U.S. patent application Ser. No. 2004/0154411AI. In said patent application a method is disclosed for detecting the angular position of the rotor of a brushless motor in which detection circuitry associated with the motor supplies a signal showing the polarity of the BEMF. The method teaches the use of a two-directional counter for counting the difference in the time periods in which logic states 1 and 0 are present at the output of the detecting circuit. A method was used to eliminate the noise that could occur on the ZC signal and simultaneously a simplified form of filter was used, which was also useful for reducing the impact of the non-perfect mechanical alignment of the polar couples. This implementation led to noise filtering, but also constituted a delay in detection of the ZCs, which delay impacted the algorithms that were designed to monitor motor speed.

BRIEF SUMMARY OF THE INVENTION

One embodiment of the present invention provides a monitoring device for the rotor of an electric motor that enables accurate detection of the ZC even in the presence of electric motors in which there is not a good alignment of the polar couples without modifying the monitoring of the speed of the electric motor.

One embodiment the present invention is a monitoring device of the position of the rotor of an electric motor, said electric motor being driven in function of a preset electric revolution time period due to two consecutive zero crossings of the back electromotive force associated with said electric motor and said device having in input a signal that is representative of the zero crossings of the back electromotive force. The device includes a detector suitable for detecting said signal in first periods of time arranged around instants of time in which the zero crossings of the back-electromotive force are expected; means suitable for setting second periods of time that are less than said first periods of time, each of said second periods of time being centered on the instant of time in which the zero crossing of the back-electromotive force is expected, other means suitable for checking whether each actual zero crossing of the back-electromotive force occurs inside each of said second periods of time and further means suitable for modifying by a preset quantity the subsequent period of electric revolution time between two consecutive expected instants of zero crossing of the back-electromotive force if said actual zero crossing of the back-electromotive force occurs outside the second period of time.

Also according to the present invention it is possible to supply a method of control of the position of the rotor of an electric motor as defined in claim 9.

BRIEF DESCRIPTION OF THE SEVERAL VIEWS OF THE DRAWINGS

The characteristics and the advantages of the present invention will be made more evident from the following detailed description of an embodiment thereof illustrated as non-limiting example in the enclosing drawings, in which.

DETAILED DESCRIPTION OF THE INVENTION

Figure 1:
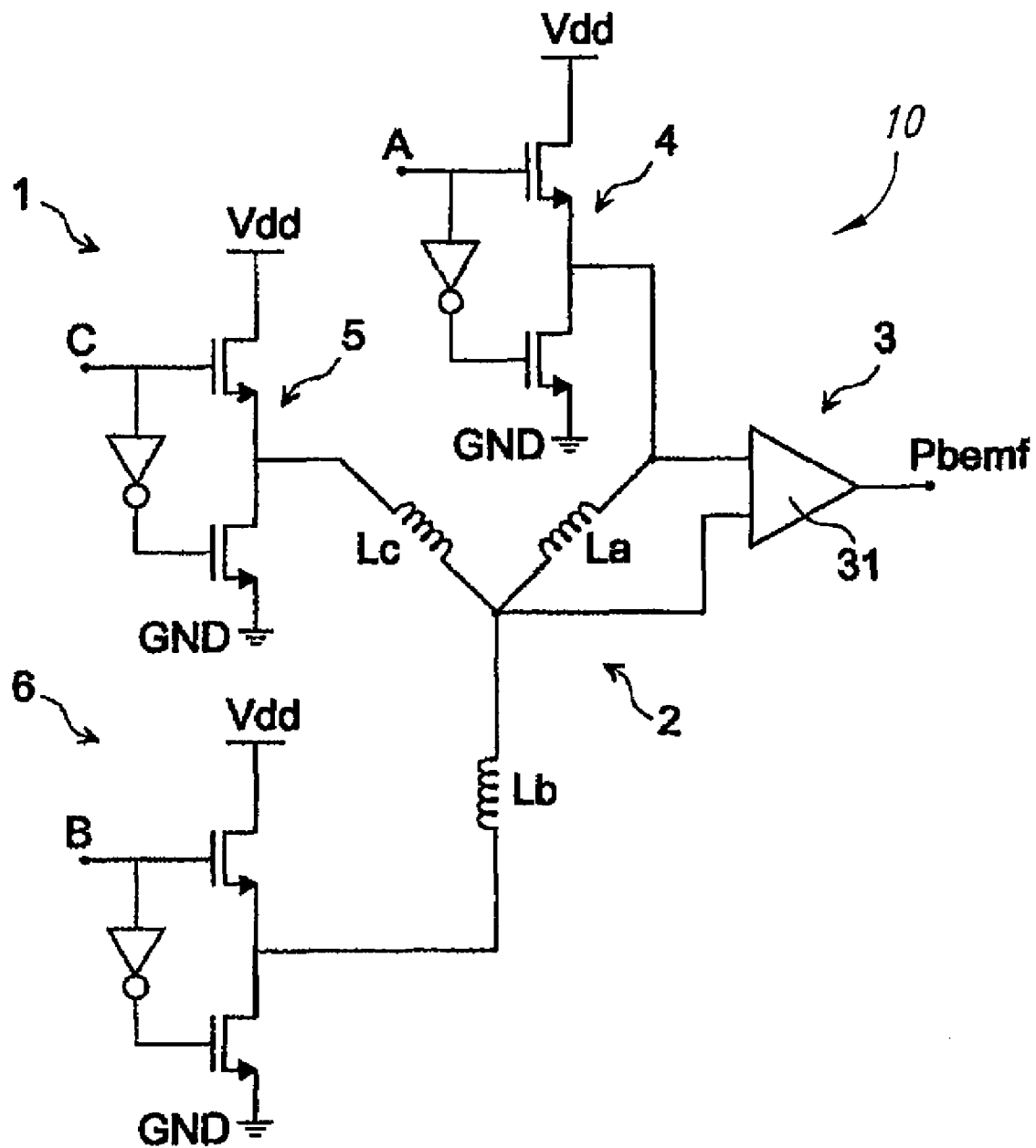
FIG. 1 is a diagram of an output stage of a driving device of a brushless motor and a device for measuring the polarity of the BEMF.
Figure 2:
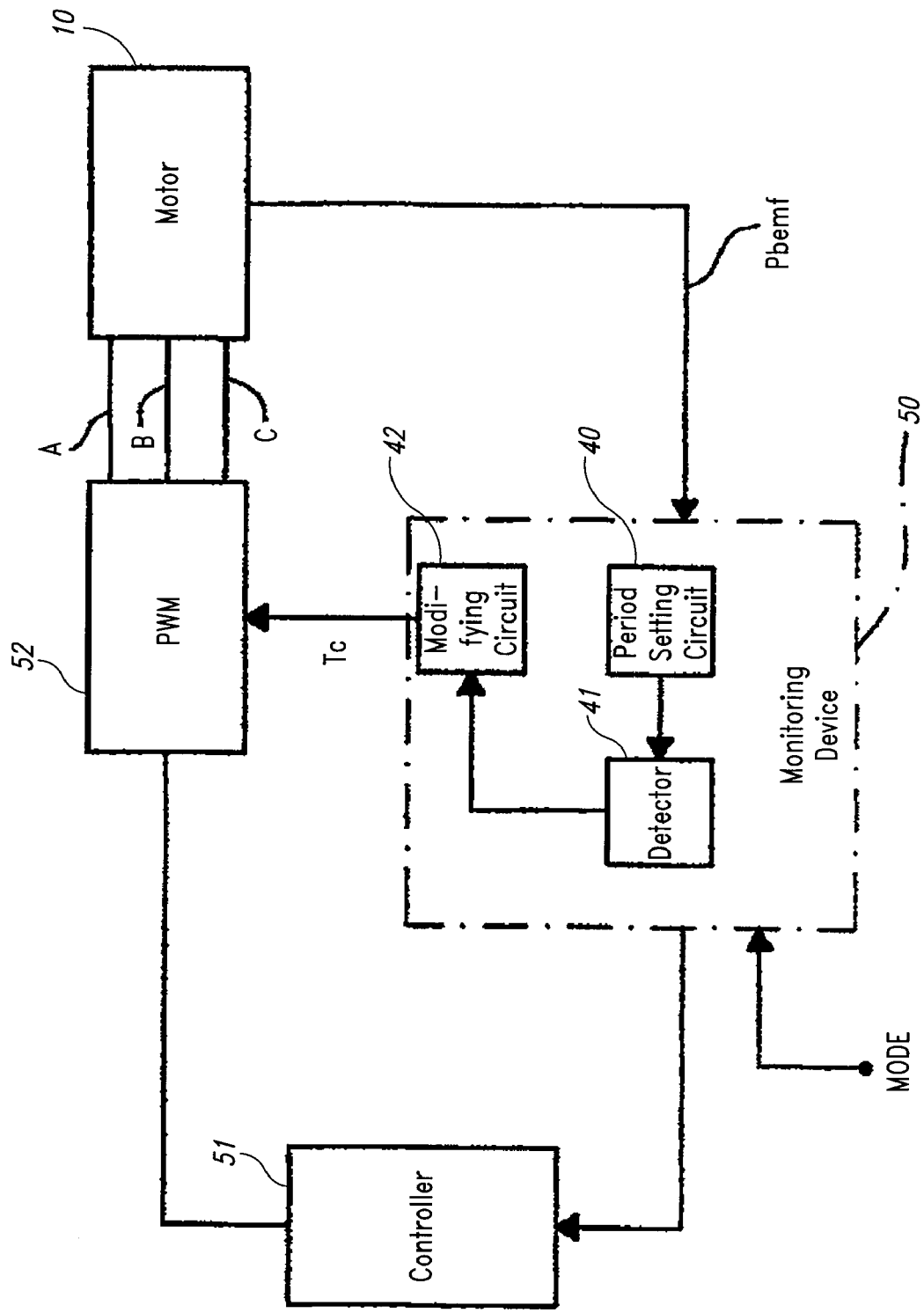
FIG. 2 is a diagram of a system for driving an electric motor comprising the monitoring device according to an embodiment of the present invention.

FIG. 2 shows a system for driving an electric motor comprising a monitoring device according to an embodiment of the present invention. In FIG. 2 item 10 indicates the circuit block shown in FIG. 1; said circuit block comprises an output stage 1 of a driving circuit and an electric motor 2, preferably of brushless type, having three La-Lc star-connected windings. The output stage generally comprises three semi-bridges 4-6 each consisting of a pair of high-side and low-side transistors arranged between a VDC supply and GND ground. The circuit block 10 comprises a device 3 suitable for measuring back-electromotive force or BEMF and suitable for providing a Pbemf polarity signal of the BEMF. Said device comprises a comparator 31 the two input terminals of which are connected to the terminals of a winding, for example the winding La, the corresponding output stage of which is placed in high impedance condition. Each time that the voltage on one of the two winding terminals La exceeds that of the other terminal a zero crossing of the BEMF is obtained.

The system in FIG. 2 comprises a monitoring device 50 having in input the signal Pbemf and being suitable for transmitting information on the ZC to a device 51 suitable for setting the speed of the electric motor by acting on a pulse width modulated (PWM) generator 52 that drives the block

10. The PWM generator 52 receives information on the cycle time Tc from the monitoring device 50.

The BEMF signal may have noise that may lead to the production of signal peaks of the measuring device 3 at each switch of the transistors of the half-bridges in the absence of suitable masking circuitry. To prevent said signal peaks affecting the correctness of the detection of the zero crossing instant, masking of the Pbemf polarity signal of the BEMF is adopted for a period of time Tp that can be programmed from the outside by a suitable command, after each switch of the transistors that constitutes the driving stage. A suitable circuitry belonging to the monitoring device 50 determines the period of enabling time Tm to the detection of the zero crossings ZC of the BEMF so that the expected ZC value falls inside said period according to a method known from patent U.S. Pat. No. 5,969,491, which is incorporated by reference herein in its entirety.

The monitoring device 50 comprises means 40 suitable for determining a period of time Tbasket within the period of time Tm and such as to be centered on the instant iZC in which the next ZC is expected. The instant iZC is calculated by the value of the period of time of the last electric revolution Tc measured as the time distance between two ZCs is an electric cycle.

The monitoring device comprises further means 41 suitable for detecting if the instant Tzc in which the actual detection of the ZC is obtained falls inside said interval Tbasket or whether it falls outside said interval Tbasket; in the latter case other means 42 modifies by a given quantity M the subsequent estimate of the period of time Tc. In particular, said other means increases the period of time Tc by a quantity M if the ZC falls outside the period of time Tbasket or decreases by the same quantity M the period of time Tc if the ZC occurs before the period of time Tbasket.

Figure 3:
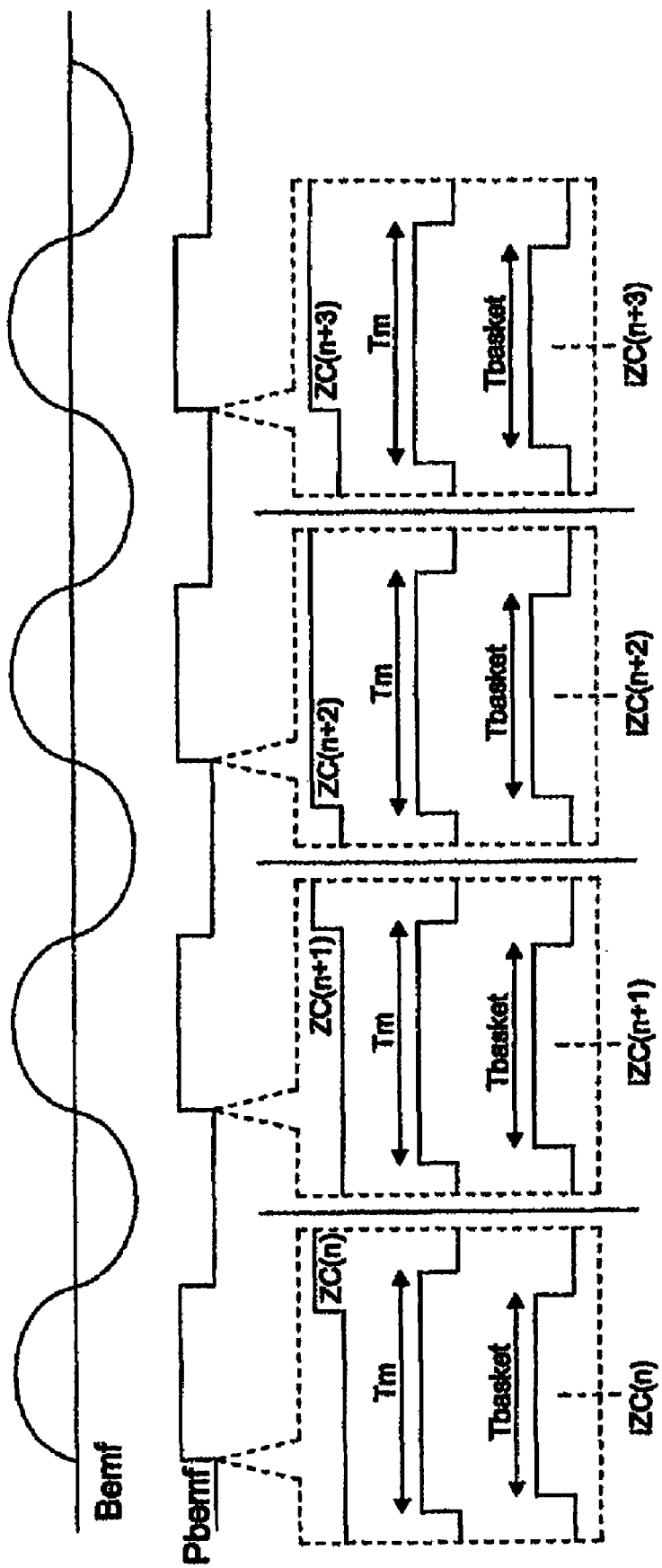
FIG. 3 shows time diagrams relating to the operation of the system in FIG. 2.

FIG. 3 shows time diagrams relating to the monitoring device 50. FIG. 3 shows possible time trends of the BEMF and of the signal Pbemf that shows the trend of a square wave with a low-voltage level and a high-voltage level; the change in the level or status of the signal Pbemf from low status to high status reveals the zero crossing of the voltage Bemf (with which the meaning of ZC is associated merely by way of example). The period of time Tbasket is centered on the estimated instant iZC and is within a period of time Tm. The expected time iZC is indicated in FIG. 3 by iZc(n) . . . iZC(n+3) where n, n+1, n+2, n+3 indicate the subsequent instants of time substantially spaced apart by a period of time Tc.

From FIG. 3 it can be seen that at the instant n with Tbasket centered on the expected value iZC(n) the instant in which there is the actual zero crossing ZC(n) falls within the period of time Tbasket. The subsequent estimate of the period of time Tc thus remains the same Tc(n+1)=Tc(n)=iZC(n+1)−iZC(n).

At the instant n+1 with Tbasket centered on the expected value iZC(n+1), the period of time Tc(n+1) being at a distance from iZC(n), the instant in which the actual zero crossing ZC(n+1) occurs is after the period of time Tbasket. The subsequent period of expected time Tc(n+2) is thus increased by a quantity M with respect to the preceding Tc(n+2)=Tc(n+1)+M=iZC(n+2)−iZC(n+1), i.e., the subsequent expected zero crossing iZC(n+2) is deferred by a quantity M.

At the instant n+2 with Tbasket centered on the expected value iZC(n+2) the instant in which ZC(n+2) is obtained occurs before the period of time Tbasket. The subsequent period of expected time Tc(n+3) is thus decreased by a quantity M (the instant iZC(n+3) is brought forward with respect to the preceding estimate): Tc(n+3)=Tc(n+2)−M=iZC(n+3)−iZC(n+2).

At the instant n+3 with Tbasket centered on the expected value iZC(n+3) the instant in which ZC(n+3) is obtained falls inside the period of time Tbasket. The subsequent period of expected time Tc(n+4) thus remains the same as the preceding one: Tc(n+4)=Tc(n+3)=iZC(n+4)−iZC(n+3).

Preferably, according to a version of an embodiment of the present invention, the time zones outside Tbasket can be divided by the means 40 into K time zones (with K>0) that are concentric with respect to the expected instant of zero crossing iZC. In said further time zones TZj (with K≧j≧−K e j≠0) the correction that the means 42 has to make Mi (with i=1 . . . K) will be greater the further from iZC the zone TZj will be in which the actual zero crossing ZC will occur. In particular, with each zone TZj with j positive a correction Mi will be associated with i=j, with each zone TZj with j negative a correction Mi with i=−j will be associated. In one embodiment of the invention, the correction will be implemented only if ZC enters a time band TZj that is further than Tbasket with respect to the time zone TZj in which the preceding actual zero crossing ZC was detected (i.e., the ZC relating to the preceding electric revolution Tc) or if the last detection will occur in the bands with j having an opposite meaning: said TZjs with j=−K . . . −1 the time areas preceding the Tbasket and those with j=1 . . . K those following Tbasket (the smallest js as an absolute value are associated with the areas nearest the Tbasket) the correction Mi applies if the ZC falls in un area identified by j that is greater as an absolute value with respect to the area previously affected or if j has a different meaning with respect to the area in which the preceding zero crossing ZC will have fallen.

Figure 4:
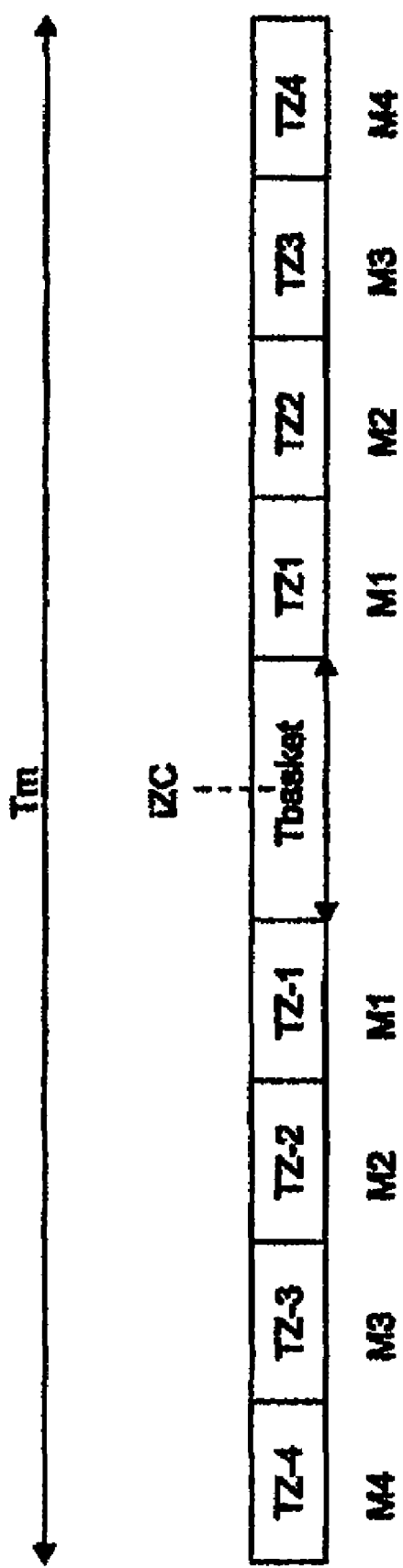
FIG. 4 shows a division of the time zones between the times Tm and Tbasket according to a version of the embodiment of the present invention.

FIG. 4 exemplifies a situation in which it is supposed that K=4: we will have four time bands TZ−1 . . . TZ−4 preceding the Tbasket and four time bands TZ1 . . . TZ4 after Tbasket, marked by the respective four corrections.

During the period Tbasket, in the device all those functions can be deactivated the activity of which entails the possibility of the entry of noise during the ZC detection and a brief masking time of which is acceptable. For example in the driving devices in question the use of 'charge pump' blocks is common that are used to increase the voltage to enable the NMOS transistors to be switched on that are generally used in the High Sides of the half-bridges used to drive the motor windings: the charge-pump can be deactivated for brief periods without impacting negatively on the general operation of the device. This function is obtainable only if the period of time Tbasket is sufficiently short to make it insignificant in relation to the cycle time Tc. In fact, if it is supposed that there is a motor in which the total asymmetry is 10 us (all the ZCs of the mechanical turn are within a range of 10 us), in this implementation it is necessary to have Tbasket>10 us whereas with prior art devices any disabling of said functions would require at least twice that length of time: 20 us. In practice, the embodiment uses noticeably less time than the prior art for the clean detection of the ZCs: during this time the deactivation of other functions of the device has less impact. Some of the functions that could be the object of the deactivation of the switching (i.e., of the freezing of the status) with minimum negative impact but which would bring significant benefits in the reduction of disturbances to the Bemf comparator (detector of ZCs) are driving of the motor coils, the charge-pump and the voltage adjusters operating in switching mode, for example. In other words, this approach is intended to drop within the time basket (and therefore within a zone that is as clean as possible) all the ZCs of the mechanical turn, even in motors in which there is major misalignment between the polar couples.

The device has the further peculiarity of being simple to make: the simple total ±Mi (with i=1 ... K and K>0) is much cheaper from the circuitry point of view than any other type of filter. In view of the simplicity thereof it may not be suitable (in relation to the choice of Mi values) for following sudden accelerations or decelerations of the motor so it must be enabled only in conditions of virtually stable speed, i.e., in operating conditions in which the distance between the ZCs can be expected to be minimal. In this condition, the improvement is clear in terms of elimination of the noise without any impact on the speed control block to which the actual motor ZC information is always passed.

The alternation between traditional methods and the method disclosed here can be left to the control of the user or to an automatic control acting on the monitoring device 50 through a MODE command: the new procedure could be activated at the moment at which a number S (with S>1) of consecutive Tcs has a time difference that is less than T1 (with T1≧0), on the other hand, if N (with N>1) consecutive Tcs have a time difference T2 (with T2≧T1), the standard approach would be adopted again. To generate the appropriate driving signals of the motor the transition phase from one procedure to another must be managed: in particular both the instantaneous position of the ZCs and the time Tc measured between the last two readings must be synchronized. When the procedure according to the invention is active, internally the center of the basket will be taken as a point reference of the expected instant iZC and Tc will be taken as a point reference of the time distance between the centers of the two consecutive baskets (regardless of where the actual ZC of the BEMF of the winding in question occurs but in relation to the processed corrections ±Mi). When on the other hand the standard procedure is active, this will establish positions ZC and Tc: at the moment of the passage to the new procedure it will be arranged that the first period of time Tbasket will be symmetrical with respect to the expected instant iZC (i.e., distant by a period of time Tc that has just been measured after the last detected ZC).

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A monitoring device for monitoring a position of a rotor of an electric motor, said monitoring device comprising:
   an input that receives a signal representing actual zero crossings of a back-electromotive force of said electric motor;
   detecting means for detecting said signal in first periods of time arranged around instants of time in which the zero crossings of the back-electromotive force are expected;
   setting means for setting second periods of time that are less than said first periods, said second periods of time being centered on the instants of time in which the zero crossings of the back-electromotive force are expected;
   checking means for checking whether each actual zero crossing of the back-electromotive force occurs inside a respective one of said second periods of time;
   modifying means for modifying by a quantity a subsequent period of electric revolution time between two consecutive expected instants of zero crossing of the back-electromotive force if one of said actual zero crossings of the back-electromotive force occurs outside the respective one of said second periods of time.

2. The device according to claim 1, wherein said modifying means is suitable for increasing said period of electric revolution time by said quantity if said actual zero crossing of the back-electromotive force occurs after said respective second period of time and is suitable for decreasing said period of electric revolution time by said quantity if said actual zero crossing of the back-electromotive force occurs before said respective second period of time.

3. The device according to claim 1, wherein said setting means is suitable for dividing time zones comprised between one of said first periods of time and a corresponding one of said second periods of time into a plurality of concentric time zones with respect to the instant of time in which a corresponding one of the zero crossings of the back-electromotive force is expected.

4. The device according to claim 3, wherein said modifying means is suitable for:
   increasing said quantity by an amount that is greater the more said actual zero crossing of the back-electromotive force occurs in a time zone of said plurality of concentric time zones that is after said second period of time and is further from said second period of time; and
   decreasing said quantity by an amount that is greater the more said actual zero crossing of the back-electromotive force occurs in a time zone of said plurality of time zones that is before said second period of time and is further from said second period of time.

5. The device according to claim 3, wherein said modifying means is suitable for:
   increasing said period of electric revolution time by the quantity when said actual zero crossing of the back-electromotive force occurs in a time zone of said plurality of concentric time zones that is arranged after said second period of time and after a time zone of said plurality of concentric time zones of a preceding electric revolution time in which the actual zero crossing occurred; and
   decreasing said period of electric revolution time by the quantity when said actual zero crossing of the back-electromotive force occurs in a time zone of said plurality of concentric time zones that is arranged before said second period of time and before a time zone of said plurality of concentric time zones of the preceding electric revolution time in which the actual zero crossing occurred.

6. The device according to claim 3, wherein said modifying means is suitable for increasing said period of electric revolution time by the quantity when said actual zero crossing of the back-electromotive force occurs in a time zone of said plurality of concentric time zones that is arranged after said second period of time and when a time zone of said plurality of concentric time zones of a preceding electric revolution time in which the actual zero crossing occurred is arranged before said second period of time and is suitable for decreasing said period of electric revolution time by the quantity when said actual zero crossing of the back-electromotive force occurs in a time zone of said plurality of concentric time zones that is arranged before said second period of time and when the time zone of said plurality of concentric time zones of the preceding electric revolution time in which the actual zero crossing occurred is arranged after said second period of time.

7. The device according to claim 1, wherein said setting means, said checking means and said modifying means are activatable and deactivatable by means of an external control.

8. The device according to claim 1, wherein said signal is a polarity signal of the back-electromotive force of the electric motor, said polarity signal adopting a first and a second value and each change from the first to the second value or vice versa of said polarity signal identifying one of said actual zero crossings.

9. A control method comprising:
   detecting a signal representing actual zero crossings of a back-electromotive force of an electric motor in first periods of time arranged around instants of time in which the zero crossings of the back-electromotive force are expected;
   forming second periods of time that are less than said first periods, each of said second periods of time being centered on the instant of time at which a corresponding one of said zero crossings of the back-electromotive force is expected;
   checking whether each actual zero crossing of the back-electromotive force occurs inside or outside a corresponding one of said second periods of time; and
   modifying by a quantity a subsequent period of electric revolution time between two consecutive expected instants of zero crossing of the back-electromotive force if one of said actual zero crossings of the back-electromotive force occurs outside the corresponding second period of time.

10. The method according to claim 9, wherein said modifying comprises increasing said period of electric revolution time by said quantity if said actual zero crossing of the back-electromotive force occurs after said second period of time and the decrease of said period of electric revolution time by said preset quantity if said actual zero crossing of the back-electromotive force occurs before said second period of time.

11. The method according to claim 9, further comprising dividing time zones comprised between one of said first periods of time and a corresponding one of said second periods of time into a plurality of concentric time zones with respect to the instant of time in which a corresponding one of the zero crossings of the back-electromotive force is expected.

12. The method according to claim 11, wherein the modifying comprises increasing said quantity by an amount that is greater the more said actual zero crossing of the back-electromotive force occurs in a time zone of said plurality of concentric time zones that is arranged after said second period of time and is further from said second period of time and decreasing said quantity by an amount that is greater the more said actual zero crossing of the back-electromotive force occurs in a time zone of said plurality of concentric time zones that is arranged before said second period of time and is further from said second period of time.

13. The method according to claim 11, wherein the modifying comprises:
   increasing said period of electric revolution time by the quantity when said actual zero crossing of the back-electromotive force occurs in a time zone of said plurality of concentric time zones that is arranged after said second period of time and after a time zone of said plurality of concentric time zones of a preceding electric revolution time in which the actual zero crossing occurred; and
   decreasing said period of electric revolution time by the quantity when said actual zero crossing of the back-electromotive force occurs in a time zone of said plurality of concentric time zones that is arranged before said second period of time and before the time zone of said plurality of concentric time zones of the preceding electric revolution time in which the actual zero crossing occurred.

14. The method according to claim 11, wherein the modifying comprises:
   increasing said period of electric revolution time by the quantity when said actual zero crossing of the back-electromotive force occurs in a time zone of said plurality of concentric time zones that is arranged after said second period of time and when a time zone of said plurality of concentric time zones of a preceding electric revolution time in which the actual zero crossing occurred is arranged before said second period of time; and
   decreasing said period of electric revolution time by the quantity when said actual zero crossing of the back-electromotive force occurs in a time zone of said plurality of concentric time zones that is arranged before said second period of time and when the time zone of said plurality of concentric time zones of the preceding electric revolution time in which the actual zero crossing occurred is arranged after said second period of time.

15. An electric motor, comprising:
   a rotor; and
   monitoring device for monitoring a position of the rotor, the monitoring device including:
      an input that receives a signal representing actual zero crossings of a back-electromotive force of said electric motor;
      a detector structured to detect said signal in first periods of time arranged around instants of time in which the zero crossings of the back-electromotive force are expected;
      a checking circuit structured to checking whether each actual zero crossing of the back-electromotive force occurs inside a respective one of a plurality of second periods of time that are less than said first periods, said second periods of time being centered on the instants of time in which the zero crossings of the back-electromotive force are expected; and
      a controller circuit structured to modify by a quantity a subsequent period of electric revolution time between two consecutive expected instants of zero crossing of the back-electromotive force if one of said actual zero crossings of the back-electromotive force occurs outside the respective one of said second periods of time.

16. The electric motor according to claim 15, wherein said controller circuit is structured to increase said period of electric revolution time by said quantity if said actual zero crossing of the back-electromotive force occurs after said respective second period of time and is structured to decrease said period of electric revolution time by said quantity if said actual zero crossing of the back-electromotive force occurs before said respective second period of time.

17. The electric motor according to claim 15, further comprising a setting circuit structured to divide time zones comprised between one of said first periods of time and a corresponding one of said second periods of time into a plurality of concentric time zones with respect to the instant of time in which a corresponding one of the zero crossings of the back-electromotive force is expected.

18. The electric motor according to claim 17, wherein said controller circuit is structured to:
   increase said quantity by an amount that is greater the more said actual zero crossing of the back-electromotive force occurs in a time zone of said plurality of concentric time zones that is after said second period of time and is further from said second period of time; and
   decrease said quantity by an amount that is greater the more said actual zero crossing of the back-electromotive force occurs in a time zone of said plurality of time zones that is before said second period of time and is further from said second period of time.

19. The electric motor according to claim 17, wherein said controller circuit is structured to:

increase said period of electric revolution time by the quantity when said actual zero crossing of the back-electromotive force occurs in a time zone of said plurality of concentric time zones that is arranged after said second period of time and after a time zone of said plurality of concentric time zones of a preceding electric revolution time in which the actual zero crossing occurred; and decrease said period of electric revolution time by the quantity when said actual zero crossing of the back-electromotive force occurs in a time zone of said plurality of concentric time zones that is arranged before said second period of time and before a time zone of said plurality of concentric time zones of the preceding electric revolution time in which the actual zero crossing occurred.

20. The electric motor according to claim 17, wherein said controller circuit is structured to:

increase said period of electric revolution time by the quantity when said actual zero crossing of the back-electromotive force occurs in a time zone of said plurality of concentric time zones that is arranged after said second period of time and when a time zone of said plurality of concentric time zones of a preceding electric revolution time in which the actual zero crossing occurred is arranged before said second period of time; and decrease said period of electric revolution time by the quantity when said actual zero crossing of the back-electromotive force occurs in a time zone of said plurality of concentric time zones that is arranged before said second period of time and when the time zone of said plurality of concentric time zones of the preceding electric revolution time in which the actual zero crossing occurred is arranged after said second period of time.

21. The electric motor according to claim 15, wherein said signal is a polarity signal of the back-electromotive force of the electric motor, said polarity signal adopting a first and a second value and each change from the first to the second value or vice versa of said polarity signal identifying one of said actual zero crossings.

\* \* \* \* \*